United States Patent [19]

Hagen

[11] 4,369,984
[45] Jan. 25, 1983

[54] PASSENGER VEHICLE SUCH AS A BUS HAVING A LATERALLY EXTENDING STAIR ASSEMBLY

[75] Inventor: Hans Hagen, Munich, Fed. Rep. of Germany

[73] Assignee: Maschinenfabrik Augsburg-Nurnberg Aktiengesellschaft, Munich, Fed. Rep. of Germany

[21] Appl. No.: 205,421

[22] Filed: Nov. 10, 1980

[30] Foreign Application Priority Data

Nov. 17, 1979 [DE] Fed. Rep. of Germany ....... 2946531

[51] Int. Cl.³ .......................... B60R 3/02; B62D 25/22
[52] U.S. Cl. ..................... 280/166; 105/445; 105/447; 182/19; 182/91
[58] Field of Search ................ 280/163, 166; 105/437, 105/438, 430, 431, 443, 448, 445, 425, 449; 182/19, 91

[56] References Cited

U.S. PATENT DOCUMENTS

| | | | |
|---|---|---|---|
| 1,628,505 | 5/1927 | Lundquist | 105/448 |
| 2,487,921 | 11/1949 | Gulver | 105/448 |
| 3,776,143 | 12/1973 | Cox et al. | 105/443 |
| 4,020,920 | 5/1977 | Abbott | 280/166 |

*Primary Examiner*—Richard A. Bertsch
*Attorney, Agent, or Firm*—Posnack, Roberts, Cohen & Spiecens

[57] ABSTRACT

A stair assembly for a passenger vehicle, especially an omnibus, in which the stair assembly is arranged in a lateral access area of the vehicle. The stair assembly comprises a horizontally extendable first stair member connected by links to a second stair member to form a parallelogram linkage in which the second stair member can be pivotally moved towards the ground and laterally outwards from the first stair member. In order to bridge a lateral gap between the vehicle and the edge of a boarding platform, the first stair member whose upper surface is at the level of the platform, is extended towards the edge of the platform and the second stair member is carried along in a parallel position beneath the first stair member. When the bus is to be boarded and unboarded from the ground, the first stair member is fully extended, together with the second stair member beneath it whereafter the second stair member is pivoted into lowered position.

17 Claims, 8 Drawing Figures

PASSENGER VEHICLE SUCH AS A BUS HAVING A LATERALLY EXTENDING STAIR ASSEMBLY

FIELD OF THE INVENTION

This invention relates to a vehicle for public transportation, especially a bus, having at least one extendable stair assembly arranged at its lateral boarding area.

PRIOR ART

With vehicles of this type considerable difficulty is experienced when attempting to provide easy boarding and unboarding arrangements for the vehicle with respect to different boarding and unboarding levels, on the one hand, and to acceptable road clearance on the other hand.

These difficulties are especially evident for so called dual-mode bus systems, where busses are boarded from platforms on city routes on the one hand, and where on the other hand, they are boarded conventionally from the curb or directly from the roadway on country, suburban or long-distance routes.

Boarding platforms can be made relatively high to permit passengers to board or unboard at one level. When the vehicle has drawn up to the platform, however, there normally remains a gap between the exit edge of the bus and the edge of the platform, said gap being practically impossible to avoid with ordinary driving skill. Then when the passengers board or unboard the bus carelessly this gap may be the cause of considerable personal injury. Accordingly, the gap calls for added attention in the boarding and unboarding process, which inevitably requires relatively long idle times for the bus in picking up or discharging passengers. It would take relatively complex provisions to accurately guide the bus along the edge of the platform and thereby at least partially bridge the gap.

On the other hand, adaptation of the entrance and exit level of the bus to the level of the boarding platform requires the passengers to overcome relatively great differences in level when the bus draws up to a stop, the level of which is more or less equal to road level.

According to an earlier proposal, a public transportation vehicle, more particularly a bus, is fitted with a folding staircase in the lateral boarding area to provide ease of access from the road and keep bothersome stairwells from projecting into the passenger compartment. In this earlier arrangement, the staircase was an essentially prismatic flight of stairs having a right, triangular cross-section whose hypotenuse surface is provided with steps and which in the area of its vertical, longitudinal leg is pivotally connected to the vehicle for movement about an axis extending parallel to the longitudinal center line of the vehicle. In this arrangement, the pivotal axis is disposed in the vehicle such that the staircase can be pivoted into an extreme position in which the lower horizontal surface becomes substantially vertical and substantially flush with the side panel of the vehicle.

In the stowed position of the staircase, this earlier proposal permits single-level transit from a boarding platform to a suitably adapted entrance and exit level of the floor of the passenger compartment. Not only does the earlier proposal fail to deal with the problem of single-level platform-to-bus transit for passengers, but there also remains the risk of a lateral gap between the edge of the exit side of the vehicle and the adjacent edge of the boarding platform.

Additionally, the staircase of the earlier proposal requires a relatively large amount of space in its retracted position, which may adversely affect the accommodation of luggage or auxiliary equipment underneath the floor of the passenger compartment.

Printed German Patent specification DE-OS No. 24 54 417 further discloses a passenger vehicle, especially a bus, having a staircase of folding-fence construction which extends laterally and downwards simultaneously, if desirable, with the opening movement of the side door.

In this arrangement the hinge components of the folding fence which come to the upper surface when the staircase is in its operating position form a grid permitting single-level transit of passengers to a platform.

In this known construction no provisions were made to permit safe, rapid and single-level transit without gaps between the vehicle and the platform.

This applies also to a known bus having a step arrangement as disclosed in printed German Patent specification DE-OS No. 26 11 655. In this known arrangement, links are pivotally arranged for rotation about axes extending parallel with the longitudinal center line of the vehicle, to which are hinged separate steps via brackets such that when the links are jointly lowered a staircase is formed in the passenger compartment, whereas when the links are jointly raised into the neutral position the steps will be at the same level as the inner floor of the vehicle.

This known arrangement may inadvertantly be the cause of injury, for example, to people standing on the steps when the staircase is being extended or retracted.

In addition, ease of access to the bus from the road is achieved only if the ground clearance and the angle of slope are relatively small.

SUMMARY OF THE INVENTION

In a broad aspect, an object of the present invention is to provide a construction which eliminates the disadvantages of the previously disclosed arrangements as discussed above and to provide an improved vehicle or bus having at least one laterally extending staircase especially adaptable to said dual-mode bus system, while providing easy and rapid boarding and unboarding with little danger to the passenger.

A staircase suitable to meet these objects is characterized by a relatively simple construction, relatively modest actuating power, rapid operation and minimum requirement for usable space in the vehicle.

According to an advantage of the staircase of the present invention the lateral distance of a bus from the edge of a stationary boarding platform can be kept relatively great and boarding and unboarding can be effected without a gap and its attendant danger, and where no relatively complex and costly provisions must be made for accurate guidance of the vehicle along the edge of a stationary boarding platform.

The stair assembly of the present invention also permits easy boarding of passengers from the curb or from the road.

In accordance with the invention, there is provided a stair assembly for a vehicle having a lateral access opening wherein said stair assembly comprises a horizontal first stair member and a horizontal second stair member disposed at a level below the first stair member. The second stair member is suspended from the first stair member by links or other suitable means so as to be capable of undergoing movement downwardly and laterally outwards to an extended position and upwardly and laterally inwards to a retracted position. The second stair member is beneath the first stair member in the retracted position. Actuator means are connected to both stair members for moving the first stair member horizontally between a retracted position in the access opening and an extended position projecting from the access opening and for moving the second stair member between the extended and retracted positions thereof. Thereby, in the extended positions of both stair members, a step is formed between the stair member outside the access opening and in the extended position of the first stair member with the second stair member retracted, the stair assembly can bridge a gap between the access opening and an adjoining platform spaced therefrom.

DETAILED DESCRIPTION

Figure 1:
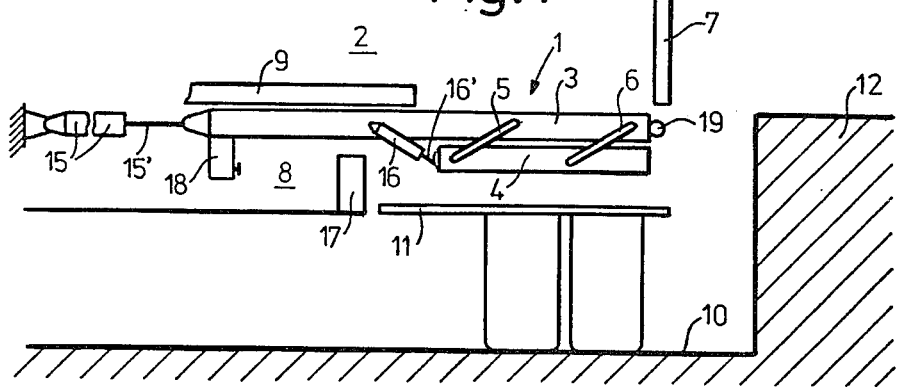
FIG. 1 is a partial sectional view of a bus and illustrates the retracted or neutral position of a stair assembly in correlation with a boarding platform.
Figure 2:
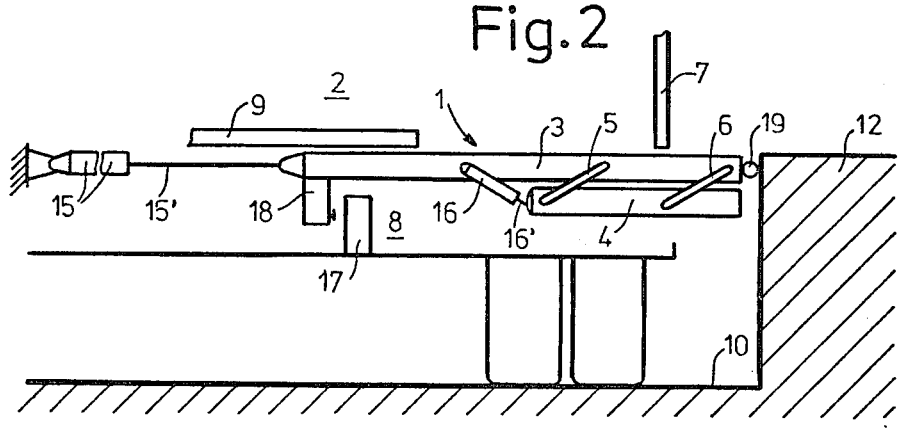
FIG. 2 is a partial sectional view similar to FIG. 1 and illustrates an intermediate position of the stair assembly when extended halfway toward the edge of the boarding platform.
Figure 3:
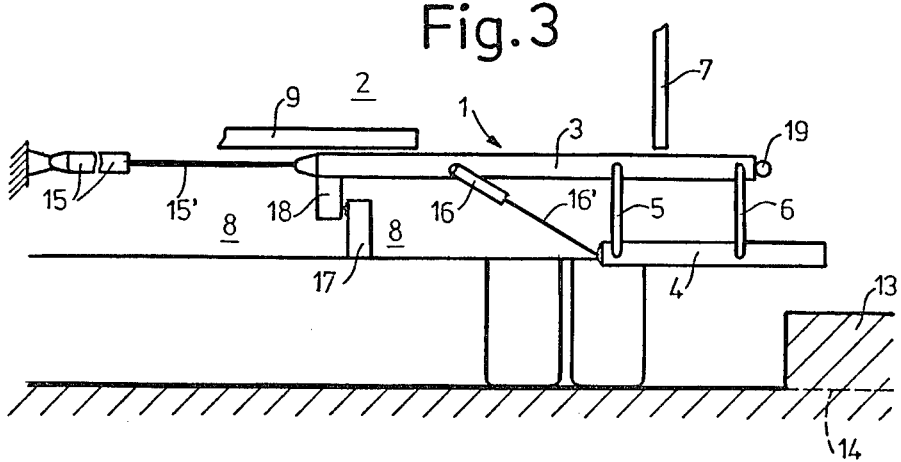
FIG. 3 is a partial sectional view similar to FIG. 1 and illustrates the fully extended operating position of the stair assembly in which it permits boarding from the curb or the road.

With reference now to FIGS. 1 to 3, therein is seen a stair assembly 1 comprising a horizontally extending first stair member 3 in a boarding area of the bus 2, and a horizontally extending second stair member 4 pivotally suspended from member 3 by links 5,6. The links 5,6 are parallel to one another and form a parallelogram linkage with the stair members 3,4. The bottom of a door 7 is seen above the stair assembly 1.

FIG. 1 illustrates the fully retracted or neutral position of the stair assembly 1 when the bus is moving. In the retracted position, the second stair member 4 has been pivoted into a position parallel and beneath the first stair member 3. In this position, the stair assembly 1 is stowed fully within a well-like recess 8 underneath the floor 9 of the passenger compartment and is shielded from the road by means of a fairing 11, which protects it from external environmental effects and particularly from intrusion of material from the road.

In FIG. 1, the bus 2 is shown in a position in which it has drawn up to loading platform 12 and the door 7 is still closed.

For easy boarding and unboarding at boarding platform 12 (FIG. 2) the lateral gap between the vehicle and the edge of the platform 12 is bridged by extending the first stair member 3 towards the platform 12, the upper surface of stair member 3 being at the level of the platform 12. In the course of extension of stair member 3, the second stair member 4 is carried along in the lateral extension movement and remains in its parallel position beneath the first stair member 3. The door 7 is opened when the stair assembly is extended and closed when it is retracted.

FIG. 3 illustrates the operating position of the stair assembly 1 when it is used to permit boarding of the bus from a curb 13 or from the roadway 14. For this purpose, the first stair member 3 is fully extended horizontally, together with the second stair member 4 beneath it. The second stair member 4 is then further extended laterally and downwards immediately after the first stair member 3 has reached its maximum extended position.

As seen in FIGS. 1–3, hydraulic or pneumatic actuators 15 and 16 are provided which are separately operable and which respectively serve to horizontally extend the stair assembly 1 and pivot the second stair member 4 into lowered position. The actuator 15 is hinged to the vehicle at one end and to the first stair member 3 by its piston rod 15' or an extension thereof at the other end. The actuator 16 is hinged to the first stair member 3 at one end and to the second stair member 4, by its piston rod 16' or an extension thereof at the other end.

As also seen FIGS. 1 to 3, the maximum allowable travel for the horizontal extension of the stair assembly 1 is defined by cooperating stops 17,18 respectively on the vehicle and on the first stair member 3.

Arranged on the outer surface of the first stair member 3 is a stop surface 19 which as a result of contact with the edge of the platform during the lateral extension movement closes an electric switch or produces a control pulse causing the actuator 15 to interrupt the horizontal extension movement.

If during horizontal extension the contact surface 19 fails to make contact, i.e. with the edge of the boarding platform 12, the stair assembly 1 will then be extended to its maximum deployed position as determined by stops 17 and 18.

When the maximum deployed position of the stair assembly 1 is reached and the stops 17,18 come into contact, a further electrical switch is closed or a control pulse produced to initiate the pivotal movement of the second stair member 4 by means of the actuator 16.

Hence, when the bus is to load and unload from platform 12, the stair assembly will be extended by actuator 15 until contact surface 19 contacts platform 12, this extension being less than the maximum extension of the stair assembly. However, when the bus is to load and unload from the curb 13 or the roadway 14, the stair assembly will undergo full extension until stops 17 and 18 come into contact and produce actuation of actuator 16 to extend the stair member 4 to its lowered, outwards extended position as shown in FIG. 3.

In order to fold the stair assembly 1 from its operating position in FIG. 3 back into its retracted position in FIG. 1, the pistons of actuators 15,16 are retracted and the second stair member 4 is first pivoted into parallel position beneath the first stair member 3 by actuator 16, after which actuator 15 retracts the entire stair assembly horizontally inwards. Alternatively, the retraction of the stair assembly can be such that at the same time that the horizontal retraction movement is initiated by actuator 15, the pivotal folding movement of the second stair member 4 can be initiated by the actuator 16.

In order to produce the respective control pulses (contact of stop surface 19 with the edge of platform 12 as seen in FIG. 2 or contact of stop 18 with stop 17 as seen in FIG. 3), contacting means can be used such as pneumatic pressure switches used to operate bus doors.

The requisite control pulses are provided by electrical breaker circuits cooperating, for example, with electromotive, electromagnetic or electropneumatic actuating means to drive valves which in turn interrupt or permit the flow of pressurized air to the actuators.

Figure 4:
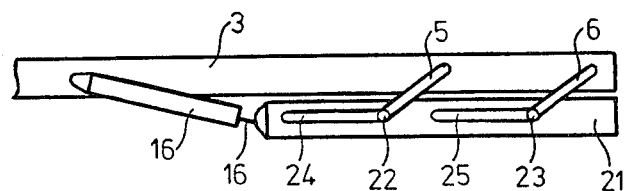
FIG. 4 illustrates a modification of the stair assembly in its retracted extreme position.
Figure 5:
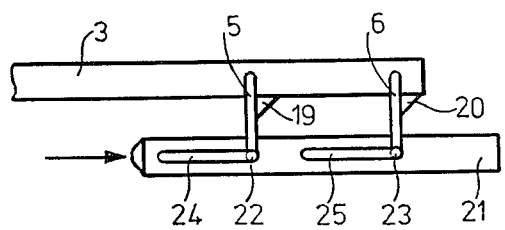
FIG. 5 shows the modification of FIG. 4 in an intermediate position.
Figure 6:
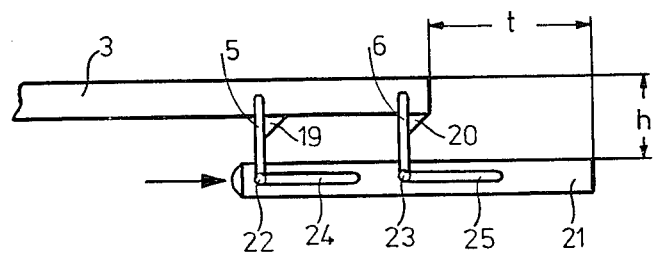
FIG. 6 shows the completely extended operating position of the modification of FIG. 4 in which it provides ease of access from the road or from the curb.

FIGS. 4,5 and 6, which use the same numerals to indicate essentially the same components, illustrate an advantageously operable modification of a stair assembly which is characterized by its compactness and by the fact that in its operating position as shown in FIG. 6 it permits especially easy access to the bus from the road level or from the curb because it provides, in relation to the height of step h, a relatively large or larger extent for the depth of step t, such that t>h.

For this purpose, this stair assembly is characterized in that the first stair member 3 carries stops 19,20 to limit the travel of the links 5,6 so that the links 5, 6 can not be pivoted beyond their vertical position.

Additionally, the embodiment shown in FIGS. 4,5 and 6 is characterized in that the portions 22,23 of the links that cooperate with the second stair member 21 can be carried in longitudinally extending slots 24,25 in the second stair member 21 whereby the longitudinal slots make it possible to achieve the relatively great depth of step t.

An advantage is also provided in a further modification of the present invention where the uppermost planar surface of the step extends flush with the inner floor of the vehicle and where the uppermost planar surface of the step is advantageously a horizontal conveyor in the shape of a plate-fitted belt.

In order to protect the stair assembly 1 and its actuating mechanism in the stowed position completely from external environmental effects, the outer, lateral opening of the well-shaped recess 8 is covered, in a manner similar to fairing 11, by a fairing not shown in the drawings, which is arranged laterally below the plane of the door and which for aerodynamic reasons is flush with the outer edge of the vehicle. Before commencing extension of the stair assembly 1, the lateral fairing below the plane of door is axially displaced or folded away in order not to obstruct the extention of the stair assembly and, thereafter, the retraction of the stair assembly.

Depending on the space requirements of the vehicle, it may also be desirable to displace or fold the fairing 11 (FIG. 1) for unobstructed extension and retraction of the stair assembly.

Figure 7:
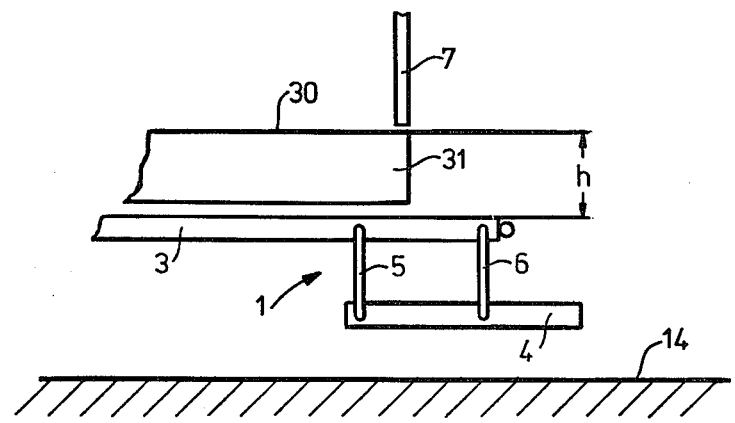
FIGS. 7 and 8 show a further embodiment of the stair assembly in different operating positions.
Figure 8:
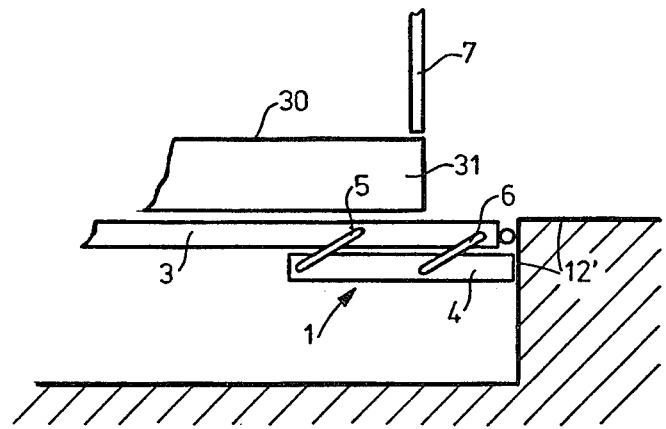

FIGS. 7 and 8 show the stair assembly 1 of FIG. 1 arranged on a bus such that the double-step stair assembly 1 is shifted downwardly by the height of a step h below the level of the vehicle floor and is installed such that the uppermost step remains part of an associated portion 31 of the vehicle, and in the fully extended operating position (FIG. 7) when the bus makes normal frequent stops, the stair assembly will then be a three-step arrangement. In this arrangement, a person boarding the bus from platform 12′ (FIG. 8) will have to take one step up, but the step can be made low. The advantage of this arrangement is that for a given road clearance of the bus, platforms can be made lower and for boarding the bus from street level 14 there will be three steps rather than two, which makes boarding and unboarding easier. This arrangement can also be used on busses whose road clearance necessitates at least three steps to enable boarding.

Another consideration is that extension and retraction of the stair assembly can be combined with suitably delayed opening and closing movements of the vehicle door.

The present invention is applicable not only to busses but also to other vehicles suitable for public transportation.

Although the invention has been described in connection with preferred embodiments thereof, it will become apparent to those skilled in the art that numerous modifications and variations can be made within the spirit and scope of the invention as defined by the attached claims.

What is claimed is:

1. A stair assembly for a vehicle having a lateral access opening, said stair assembly comprising a horizontal first stair member, a horizontal second stair member disposed at a level below the first stair member, means suspending said second stair member from said first stair member for movement relative thereto downwardly and laterally outwards to an extended position and upwardly and laterally inwards to a retracted position, said second member being beneath said first member in said retracted position, and means for moving said first stair member horizontally linearly between a retracted position in the access opening and an extended position projecting from the access opening and for moving said second stair member between said extended and retracted positions thereof such that in the extended positions of both stair members a step is formed between said stair members outside said access opening and in the extended position of said first stair member with the second stair member retracted, the first stair member can bridge a gap between the access opening and an adjoining platform spaced therefrom.

2. A movable stair assembly for a vehicle having a lateral access opening comprising a first stair member, means for moving said stair member horizontally and linearly between a retracted position in the vehicle and an extended position from the vehicle, a second stair member pivotably connected to said first stair member for movement between a retracted position beneath the first stair member and an extended position in which the second stair member forms a step with the first stair member, and means connected to said first and second stair members for moving the second stair member relative to the first stair member between its extended and retracted positions such that said first stair member is horizontally and linearly movable with the second stair member retracted therebeneath to form a lateral bridge between the vehicle and a platform adjacent the vehicle and in the absence of a platform, said second stair member is pivotably movable to its extended position from the extended first member to form steps for entry to and exit from the vehicle.

3. A stair assembly as claimed in claim 2 wherein said means suspending said second stair member from said first stair member comprises a pair of parallel links to form with said stair members a parallelogram linkage.

4. A stair assembly as claimed in claim 3 wherein said vehicle comprises a floor beneath which said first stair member is mounted for retraction and extension movements, the first stair member having an upper surface immediately proximate the lower surface of the floor.

5. A stair assembly as claimed in claim 3 comprising stops on said first stair member for engaging said links in the extended position of the second stair member to limit the travel of said links.

6. A stair assembly as claimed in claim 3 wherein said second stair member is provided with longitudinal slots, said links having respective ends slidably mounted in said slots.

7. A stair assembly as claimed in claim 3 wherein said links are vertical in the extended position of the second stair member, said stair members in the extended position of said second stair member having a depth measured horizontally between the end faces of the stair members which exceeds the height measured vertically between the upper surfaces of the stop members.

8. A stair assembly as claimed in claim 1 or 2 wherein said means for moving said stair members comprises a first actuator means for moving said first stair member and a second actuator means for moving said second stair member with respect to said first stair member.

9. A stair assembly as claimed in claim 8 wherein said first actuator means has one end pivotably connected to the vehicle and another end connected to the first stair member to extend and retract the first stair member linearly and horizontally, said second actuator means having one end pivotably connected to the first stair member and another end pivotably connected to the second stair member to pivotably move the second stair member relative to the first stair member.

10. A stair assembly as claimed in claim 9 comprising stop means on the vehicle and on said first stair member for limiting the extension of said first stair member to its extended position.

11. A stair assembly as claimed in claim 10 wherein said first stair member has an outer face, said stair assembly further comprising means on said outer face of said first stair member for sensing contact of said outer face with said platform for halting further extension of said first stair member by said first actuator means.

12. A stair assembly as claimed in claim 10 comprising means on said stop means for initiating actuation of said second actuator means to pivotably move the second stair member when the stop means senses extension of the first stair member to its extended position.

13. A stair assembly as claimed in claim 2 comprising fairing means on said vehicle covering said stair assembly in the retracted position in said lateral access opening at least from the bottom thereof to protect against intrusion of material from the road.

14. A stair assembly as claimed in claim 13 wherein the vehicle has a door beneath which the stair assembly is located, said fairing means comprising a fairing arranged laterally below the level of the door at a position beneath the stair assembly in the retracted position.

15. A stair assembly as claimed in claim 14 wherein said fairing is movable and can be displaced before the stair assembly is moved.

16. A stair assembly as claimed in claim 1 or 2 wherein the vehicle has a floor beneath which the stair assembly is mounted at a level to provide a second step between the upper surface of the first stair member and the upper surface of the floor, the second stair member in extended position being adapted to form a third step with the ground.

17. A method of providing entry to and exit from a lateral access opening of a vehicle directly to the ground or to a platform, said method comprising linearly and horizontally moving a first stair member from the access opening of the vehicle towards a platform with a second stair member retracted beneath the first stair member until the first stair member contacts the platform to form a lateral bridge therewith for entry to and exit from the vehicle, and in the absence of a platform, extending the first stair member to a maximum extended position whereafter the second stair member is pivotably moved relative to the extended first stair member to an extended position in which the second stair member forms a step with the first stair member and with the ground.

* * * * *